US011614045B2

(12) United States Patent
Stubbs et al.

(10) Patent No.: US 11,614,045 B2
(45) Date of Patent: Mar. 28, 2023

(54) METHOD OF CONTROLLING AN ENGINE

(71) Applicant: Perkins Engines Company Limited, Peterburough (GB)

(72) Inventors: Adam Stubbs, Deeping St. James (GB); Kane Lok, Peterborough (GB); Chris Burgess, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 172 days.

(21) Appl. No.: 17/286,183

(22) PCT Filed: Oct. 15, 2019

(86) PCT No.: PCT/EP2019/025348
§ 371 (c)(1),
(2) Date: Apr. 16, 2021

(87) PCT Pub. No.: WO2020/078585
PCT Pub. Date: Apr. 23, 2020

(65) Prior Publication Data
US 2021/0340928 A1 Nov. 4, 2021

(30) Foreign Application Priority Data
Oct. 17, 2018 (GB) .................................. 1816924

(51) Int. Cl.
*F02D 41/22* (2006.01)
*F02D 41/06* (2006.01)
(Continued)

(52) U.S. Cl.
CPC .......... *F02D 41/22* (2013.01); *F02D 41/062* (2013.01); *F02D 41/1454* (2013.01); *F02D 41/2403* (2013.01)

(58) Field of Classification Search
CPC .... F02D 41/22; F02D 41/062; F02D 41/1454; F02D 41/2403; F02D 2200/60; F02D 2200/606; F02D 41/02
See application file for complete search history.

(56) References Cited

U.S. PATENT DOCUMENTS 5,346,031 A * 9/1994 Gardner ................ B60W 20/00
180/65.23
5,592,919 A * 1/1997 Morikawa ............. F02D 35/023
123/435

(Continued)

FOREIGN PATENT DOCUMENTS

EP 1666711 A1 6/2006
GB 2338086 A 12/1999
JP H07208243 A 8/1995

OTHER PUBLICATIONS

International Search Report related to PCT Application No. PCT/EP2019/025348 dated Jan. 21, 2020.

(Continued)

*Primary Examiner* — Sizo B Vilakazi

(57) ABSTRACT

This disclosure relates to a method of controlling an engine and more particularly for controlling the transition between operating modes of an internal combustion engine such as between an economy mode and a performance mode. The method comprising the steps of determining a current fuel-air ratio at which the engine is operating and comparing it with a predetermined fuel-air ratio limit. The time duration for which the current fuel air-ratio is below the fuel-air ratio limit is determined and compared with a predetermined waiting time threshold value. A count is triggered, which is based on a difference between the current fuel-air ratio and the fuel-air ratio limit when the engine is operating at a current fuel-air ratio which is below the fuel-air ratio limit and this is compared with an intensity threshold value. The (Continued)

operating mode is shifted from the performance mode to the economy mode when both the time duration and the count exceed the waiting time threshold value and the intensity threshold value respectively. The operating mode is automatically shifted back to the performance mode when the current fuel-air ratio reaches or exceeds the fuel ratio limit. The method alternatively comprises using the air-fuel ratio, instead of the fuel-air ratio, and the switch from performance mode to economy mode only occurs when the current air-fuel is above a predetermined air-fuel limit and it remains above the predetermined air-fuel limit until two other predetermined thresholds have been reached.

14 Claims, 3 Drawing Sheets

(51) Int. Cl.
  *F02D 41/14* (2006.01)
  *F02D 41/24* (2006.01)

(56) References Cited

U.S. PATENT DOCUMENTS

| | | | | |
|---|---|---|---|---|
| 7,980,060 | B2 * | 7/2011 | Tachimoto | F01N 9/002 60/297 |
| 9,719,429 | B2 * | 8/2017 | Morris | F02D 11/105 |
| 9,777,664 | B2 * | 10/2017 | Foufas | F02D 41/40 |
| 2002/0107107 | A1 * | 8/2002 | Ogawa | F02D 41/023 123/295 |
| 2012/0029653 | A1 * | 2/2012 | Evans | A61F 2/4601 623/23.72 |
| 2014/0053804 | A1 * | 2/2014 | Rayl | F02D 41/0087 123/350 |
| 2015/0112577 | A1 * | 4/2015 | Velusamy | F02D 41/2422 701/110 |
| 2017/0009694 | A1 * | 1/2017 | Deshmukh | F02D 41/3011 |

OTHER PUBLICATIONS

GB Search Report related to GB Application No. 1816924.3 dated Apr. 17, 2019.

* cited by examiner

METHOD OF CONTROLLING AN ENGINE

This patent application is a 35 USC § 371 U.S. national stage of international Application No. PCDEP2019/025348 filed on Oct. 15, 2019, which claims the benefit and priority of the Great Britian Application No. 1816924.3 filed on Oct. 17, 2018.

TECHNICAL FIELD

This disclosure relates to a method of controlling an engine and more particularly for controlling the transition between operating modes of an internal combustion engine.

BACKGROUND

The Internal combustion engine is used in a very wide variety of applications, all of which have different demands. In a number of such applications, however, the engine will often experience sudden increases in loads (transient loads) during the course of operation. An engine controller may increase the amount of fuel supplied to the engine during such transient loads in order to maintain engine speed. For engines that burn an air fuel mixture, whether gaseous or liquid fuel, the rate of increase of fuel supplied to the engine is limited by the rate of increase of air supplied to the combustion and is thereby limited by the rate of increase of intake manifold air pressure of the engine. A turbocharged engine may increase the intake manifold air pressure by controlling a compressor.

Internal combustion engine performance may also be influenced by a large number of other factors and there is always a demand for more sophisticated engine controls to optimise engine performance. At times of reduced workloads, less than full engine power may be required for effective engine performance. Such periods of reduced workload may present opportunities for increasing fuel efficiency as well as for reducing engine noise and emissions.

Internal combustion engines, and particularly turbocharged internal combustion engines, may therefore have at least one power mode (performance mode) and a low power or fuel efficient mode (economy mode). In a performance mode, the engine may be operated at higher and more variable workloads and responds quickly to any variations. In economy mode, the engine may be operated at lower and more constant workloads. The economy mode may offer a relatively low engine speed during periods of reduced workload demand, whilst permitting the engine to switch back to performance mode whenever the engine may encounter higher workloads. The proper application of these operating modes may be dependent on the application of the engine. However the use of an economy mode may improve fuel economy significantly without compromising power and performance.

During low speed operation of a turbocharged engine, for example in economy mode, there may be more than sufficient air for combustion. However, the transient response time of the engine from low speed and low loads to high speed and high loads may be slow because of the time needed to increase the speed of the compressor to raise the boost pressure level from the turbocharger. Exhaust gas drives a turbine of the turbocharger which, in turn, drives a compressor of the turbocharger providing compressed air to the combustion chambers of the engine to provide the boost pressure. During low speed operation the exhaust gas flow caused by the low rate of engine displacement may fail to generate a substantial pressure drop across the turbine. As a result, the turbine may be driven at a relatively slow speed and the boost pressure level attained by the turbocharger may be low. The injection of additional fuel in the combustion chambers may increase the speed of the engine which, in turn, may create more exhaust gas flow to drive the turbine faster which, in turn, may increase the boost pressure level. However, there may be a time lag until the turbine has spun to the required speed, which will, in turn, generate the necessary boost pressure to obtain the demanded power from the engine. Also, during this relatively long transient time period there may be an insufficient amount of air for clean combustion of the amount of fuel injected creating black smoke.

As economy modes generally have lower transient response, it may be desirable for the engine to determine when to enter or exit this mode to limit the impact on the transient performance perceived by the operator.

SUMMARY

This disclosure therefore provides a method for automatically shifting an operating mode of an internal combustion engine between an economy mode and a performance mode comprising the steps of:
   determining a current fuel-air ratio at which the engine is operating;
   comparing the current fuel-air ratio to a predetermined fuel-air ratio limit;
   determining a time duration for which the current fuel-air ratio is below the fuel-air ratio limit and comparing the time duration to a predetermined waiting time threshold value;
   providing a count based on a difference between the current fuel-air ratio and the fuel-air ratio limit when the engine is operating at a current fuel-air ratio which is below the fuel-air ratio limit and comparing the count with an intensity threshold value;
   shifting the operating mode of the engine from the performance mode to the economy mode when both the time duration and the count exceed the waiting time threshold value and the intensity threshold value respectively; and
   shifting the operating mode of the engine from the economy mode to the performance mode when the current fuel-air ratio reaches or exceeds the fuel-air ratio limit.

The disclosure further provides an engine system comprising:
   an internal combustion engine having at least two operating modes comprising an economy mode and a performance mode;
   at least one sensor providing at least one output signal according to at least one operating parameter of the engine; and
   a controller configured to receive said at least one output signal from the at least one sensor and to determine the current fuel-air ratio of the engine from said at least one output signal;
   wherein a predetermined fuel-air ratio limit, a predetermined waiting time threshold and a predetermined intensity threshold are stored in the controller and the controller is programmed to shift the operating mode of the engine between the economy mode and the performance mode according to the aforementioned method.

The disclosure further provides a method for automatically shifting an operating mode of an internal combustion engine between an economy mode and a performance mode comprising the steps of:

determining a current air-fuel ratio at which the engine is operating;
   comparing the current air-fuel ratio to a predetermined air-fuel ratio limit;
   determining a time duration for which the current air-fuel ratio is above the air-fuel ratio limit and comparing the time duration to a predetermined waiting time threshold value;
   providing a count based on a difference between the current air-fuel ratio and the air-fuel ratio limit when the engine is operating at a current air-fuel ratio which is above the air-fuel ratio limit and comparing the count with an intensity threshold value;
   shifting the operating mode of the engine from the performance mode to the economy mode when both the time duration and the count exceed the waiting time threshold value and the intensity threshold value respectively; and
   shifting the operating mode of the engine from the economy mode to the performance mode when the current fuel-air ratio reaches or falls below the air-fuel ratio limit.

The disclosure further provides an engine system comprising:

an internal combustion engine having at least two operating modes comprising an economy mode and a performance mode;
   at least one sensor providing at least one output signal according to at least one operating parameter of the engine; and
   a controller configured to receive said at least one output signal from the at least one sensor and to determine the current air-fuel ratio of the engine from said at least one output signal;
   wherein a predetermined air-fuel ratio limit, a predetermined waiting time threshold and a predetermined intensity threshold are stored in the controller and the controller is programmed to shift the operating mode of the engine between the economy mode and the performance mode according to the aforementioned method.

BRIEF DESCRIPTION OF THE DRAWINGS

Aspects of the present disclosure are described below, by way of example only, with reference to the following drawings, in which.

DETAILED DESCRIPTION

Figure 1:
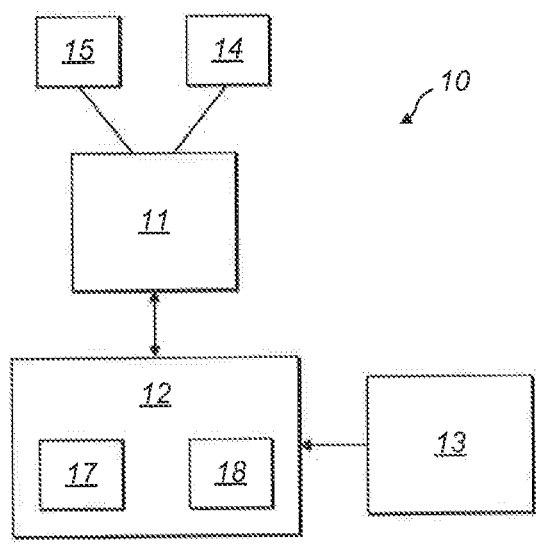
FIG. 1 is a schematic representation of an internal combustion engine system.

FIG. 1 illustrates an engine system 10 suitable for operating the method disclosed herein. The engine system 10 may comprise an engine 11, which may be an internal combustion engine, and which may comprise a turbocharger (not shown). The turbocharger may be a fixed geometry, variable geometry or other type of turbocharger. Alternatively the engine 11 may comprise a supercharger or another device for increasing the pressure of air supplied to the engine 11.

The engine system 10 may further comprise an engine control unit 12 (also known as an ECU or ECM) connected to the engine 11. The engine control unit 12 may carry out a number of functions, including monitoring and controlling the speed of the engine 11. The engine control unit 12 may be part of the main control system (not shown) of a machine or vehicle in which the engine system 10 is installed, which controls other functions of the machine or vehicle and the engine 11. Alternatively it may be a separate module. The engine control unit 12 may comprise a memory, which may store instructions or algorithms in the form of data, and a processing unit, which may comprise software which is configured to perform operations based upon the instructions. The memory may comprise any suitable computer-accessible or non-transitory storage medium for storing computer program instructions, such as RAM, SDRAM, DDR SDRAM, RDRAM, SRAM, ROM, magnetic media, optical media and the like. The processing unit may comprise any suitable processor capable of executing memory-stored instructions, such as a microprocessor, uniprocessor, a multiprocessor and the like The engine control unit 12 may also be connected to and receive signals from at least one sensor 13, to enable it to determine the current fuel-air ratio (FAR), which is the ratio between the mass of fuel and the mass of air at which the engine 11 is operating. The current FAR may be determined in a number of ways, for example by calculation of the current FAR based on direct measurements of properties of the engine fuel and the intake air, such as temperature, pressure and flow rate from the injectors and the air intake manifold. Appropriate measurement equipment and calculations for determining the current FAR based on measured properties of the fuel, intake air and/or the fuel/air mixture will be apparent to those skilled in the art. The sensor 13 may be a fuel-air ratio sensor configured to provide the FAR of the engine 10. Alternatively the sensor 13 may be an oxygen sensor, which measures oxygen within the engine 10.

The engine control unit 12 may have one or more engine maps and/or algorithms stored in its memory, one of which may relate to the FAR limit for the engine 10. The FAR limit may correspond to a predetermined smoke limit of the engine 11. This may be the full load limit of the engine 11 in normal service, beyond which point the fuel cannot be completely burned. Above this point, resultant combustion is inefficient and leads to high fuel consumption and dense clouds of smoke.

The engine 11 may have at least two operating modes, namely an economy mode 14 and a performance mode 15. The internal combustion engine system 10 may have more than one performance mode 16, although in this disclosure only one will be described. The economy mode 14 may be selected when low workload conditions are relatively constant, which may produce a low engine speed, on a consistent basis, and irrespective of workload demand on the engine 11.

Figure 2:
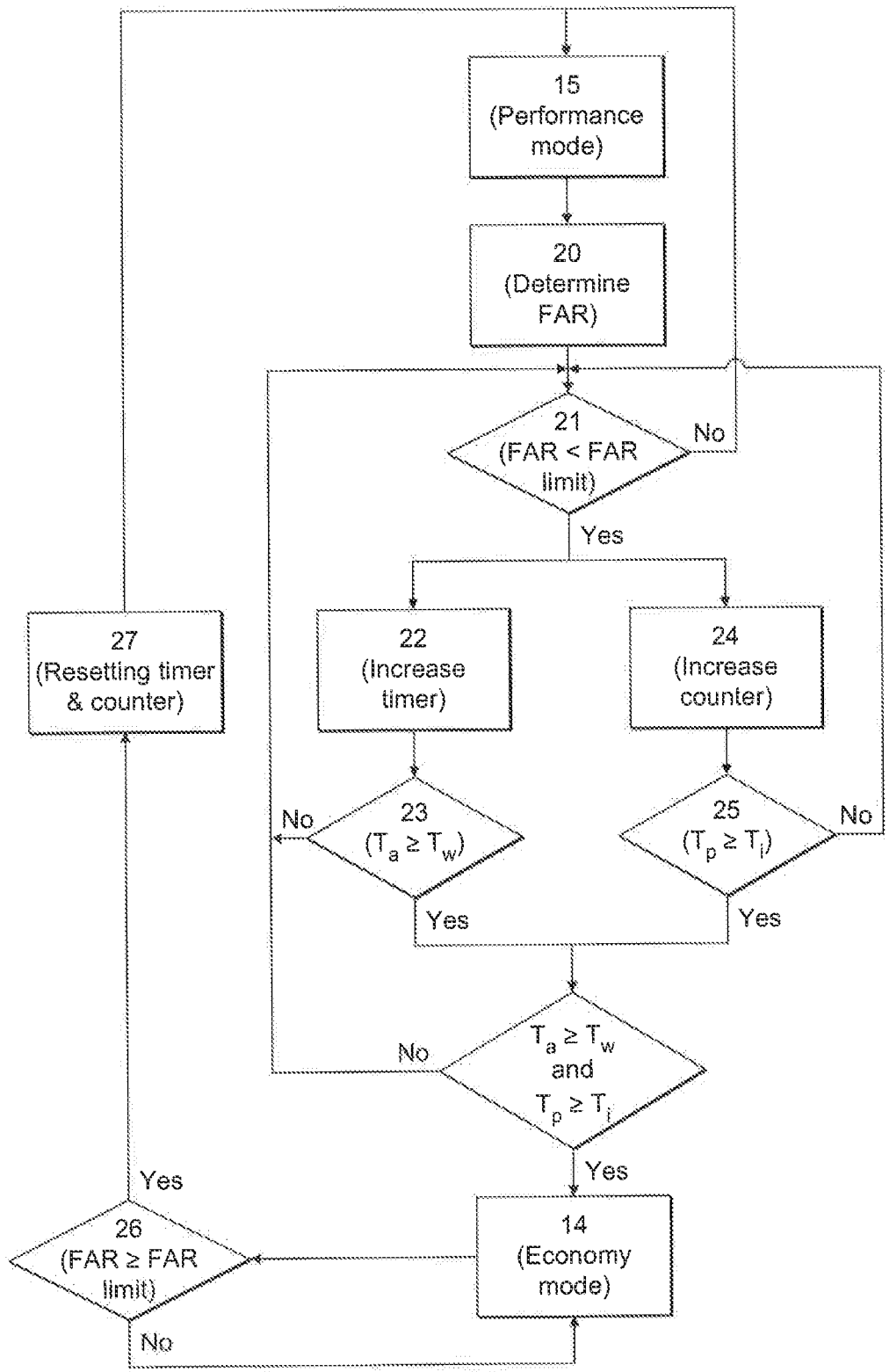
FIG. 2 is a flow chart illustrating the method of the controlling the transition between operating modes of the internal combustion engine of the system of FIG. 1.
Figure 3:
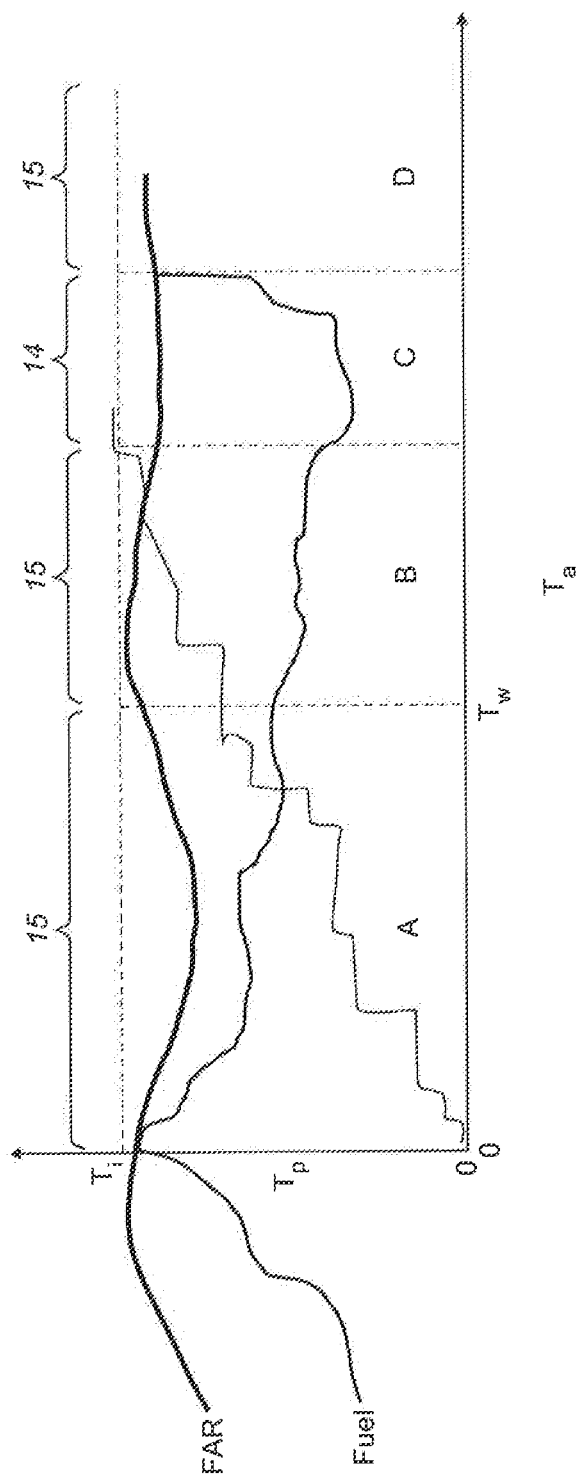
FIG. 3 is a graph illustrating the transition between operating modes of the internal combustion engine as a function of time.

Under consistently higher demand workloads, however, a constantly high engine power may be required, and a relatively high engine speed is required to assure appropriate accommodation of the relatively workload demand. The engine control unit 12 may be programmed with a control strategy which operates according to the method of the present disclosure to automatically switch between the economy and performance modes 14, 15 under certain predetermined conditions. The control strategy is illustrated in the flow diagram of FIG. 2, which is described on the basis that the engine 12 is initially in performance mode 15. It should be noted that, although the following refers to numbered steps, these are not necessarily sequential. The numbers are merely used for ease of reference to the diagram. Reference is also made to the graph of FIG. 3.

The switch from performance mode 15 to economy mode 14 only occurs when the current FAR is below a predetermined FAR limit and it remains below the predetermined FAR limit until two other predetermined thresholds have been reached. This may be achieved as follows.

The engine control unit 12 may continuously determine the current FAR (step 20) and a compare the current FAR to the predetermined FAR limit (step 21). If the current FAR is at or above the FAR limit, the engine control unit 12 makes no change to the operating mode and leaves engine 12 in performance mode 15.

If the current FAR falls below the FAR limit (sections A and B in the graph of FIG. 3), the engine control unit 12 may determine a time duration for which the current FAR is below the FAR limit. The engine control unit 12 may use a timer 17 to measure this time duration, which is the actual time elapsed (Ta) since the FAR limit was last reached. The timer 17 may be triggered (step 22) as soon as the FAR limit is reached. The engine control unit 12 may be programmed with a waiting time threshold (Tw), which is one of the two aforementioned thresholds which may be reached before the economy mode 14 may be activated. The engine control unit 12 may only shift the engine operating mode from performance mode 15 to economy mode 14 once this waiting time threshold (Tw) has been exceeded, i.e. Ta>Tw. This is determined in step 23.

The engine control unit 12 additionally uses a counter 18 to provide a count, an intensity count (Tp), which is a measure of operating intensity based on how far below the FAR limit the engine 11 is operating and for how long. The count is therefore based on a difference between the current FAR and the FAR limit when the engine 10 is operating at a current FAR below the FAR limit. The counter 18 is therefore also triggered (step 24) as soon as the FAR limit is reached to provide said intensity count (Tp). The intensity count (Tp) provides the measure of how much below the FAR limit the current FAR is as the counter 18 may be set to increment faster, the further away from the FAR limit the engine 11 remains. The intensity count (Tp) is a cumulative count, determined in the following manner.

The counter 18 may continuously increment, once triggered, at a consistent predetermined time interval (loop time). One example of a predetermined loop time may be 15 ms. The proximity to the FAR limit may be re-calculated at every loop of the counter 18 and, in addition to the increment which occurs for each loop, there may be an additional increment which is based on the current proximity to FAR limit at that time. The counter 18 may use a calibration table (see below), which determines the amount of additional increment according to the proximity of the current FAR to the FAR limit.

| Calibration table | |
|---|---|
| Proximity to FAR Limit | Counter Increment |
| 0.5 | 0 |
| 0.75 | 1 |
| 1 | 2 |
| 1.25 | 4 |
| 1.5 | 6 |
| 2 | 8 |
| 5 | 10 |
| 10 | 15 |
| 20 | 20 |
| 30 | 30 |
| 40 | 40 |

The engine control unit 12 may be pre-programmed with such a calibration table. The increment rates may be based on engine data and data relating to the machine or vehicle which the engine 11 is powering and may be set by machine and engine dynamometer testing to meet predetermined response requirements.

The engine control unit 12 may further be programmed with the second of the two aforementioned thresholds which may be reached before the economy mode 14 may be activated, namely an intensity threshold (Ti). The engine control unit 12 may only shift the engine operating mode from performance mode 15 to economy mode 14 once this intensity threshold (Ti) has been exceeded by the intensity count (Tp), i.e. Tp>Ti. This is determined in step 25.

The waiting threshold (Tw) and the intensity threshold (Ti) may also be based on engine data and data relating to the machine or vehicle which the engine 11 is powering. Only when both of the waiting and intensity thresholds (Tw, Ti) have been exceeded by the elapsed time (Ta) and the intensity count (Tp) respectively is the engine 10 considered to be operating in a low duty cycle mode and economy mode 14 may be activated (section C of the graph in FIG. 3).

The waiting time threshold (Tw) and intensity threshold (Ti) are selected to ensure that the engine 10 is subject to suitably a light load for a suitable period for which economy mode 14 would be suitable. The waiting time threshold (Tw) may therefore prevent economy mode 14 from being activated as a result of a transient dip in the actual FAR. If the engine 11 is operated for a significant amount of time with the actual FAR Just under the FAR limit, then this is an indicator that there is a reasonable load for which economy mode 14 would not be suitable. The intensity threshold (Ti) may therefore prevent a switch to economy mode 14 whilst the engine 11 is being operated at such a load, albeit if the actual FAR is below the FAR limit.

If the timer 16 reaches the waiting time threshold (Tw), but counter 18 has not yet exceeded the intensity threshold (Ti) (section B of the graph in FIG. 3), economy mode 14 may not yet be enabled, and the engine 10 may remain in performance mode 15 and the monitoring of the FAR may continue. Only when the intensity threshold (Ti) is subsequently exceeded by the intensity count (Tp) may the economy mode 14 be enabled. If the intensity count (Tp) is reached before the waiting threshold (Tw) has been exceeded by the elapsed time (Ta), the monitoring of the FAR may continue. Only when the waiting threshold (Tw) is subsequently exceeded by the elapsed time (Ta) may the economy mode 14 be enabled.

The engine control unit 12 continues to compare the current FAR and compares it to the FAR limit (step 26). Economy mode is immediately exited and the engine 11 is shifted back to the performance mode if the current FAR reaches the FAR limit threshold (section D of the graph of FIG. 3). At this point, the counter 17 and timer 16 are reset to zero (step 27).

When the engine 11 is initially started, both the timer 16 and counter 17 may be reset to zero, to ensure that the engine 11 starts in performance mode 15. This may be to allow predetermined start-up condition checks to be carried out by the engine control unit 12, for example, to check the de-rate condition of the engine 11 and that the correct coolant temp is reached etc. The engine control unit 12 may be programmed to not activate economy mode 14, i.e. the shift is prohibited, if the engine 11 does not satisfy all of the start-up condition checks, even if waiting threshold (Tw) and intensity threshold (Ti) are exceeded.

Whilst the foregoing description refers to the current FAR and FAR limit, it should be noted that the inverse, namely the air-fuel ratio (AFR), may also be used in the method and engine system of the present disclosure. Where the AFR is used as the basis, the switch from performance mode 15 to economy mode 14 only occurs when the current AFR is above a predetermined AFR limit and it remains above the predetermined AFR limit until two other predetermined thresholds have been reached.

The engine control unit 12 may continuously determine the current AFR and compare the current AFR to the predetermined AFR limit. If the current AFR is at or below the AFR limit, the engine control unit 12 makes no change to the operating mode and leaves engine 12 in performance mode 15.

If the current AFR increases above the AFR limit, the engine control unit 12 may determine a time duration for which the current AFR is above the AFR limit. The engine control unit 12 may use a timer 17 to measure this time duration, which is the actual time elapsed (Ta) since the AFR limit was last reached. The timer 17 may be triggered as soon as the AFR limit is reached. The engine control unit 12 may be programmed with a waiting time threshold (Tw), which is one of the two aforementioned thresholds which may be reached before the economy mode 14 may be activated. The engine control unit 12 may only shift the engine operating mode from performance mode 15 to economy mode 14 once this waiting time threshold (Tw) has been exceeded, i.e. Ta>Tw.

In this case, the intensity count (Tp) is based on a difference between the current AFR and the AFR limit when the engine 10 is operating at a current AFR above the AFR limit. The counter 18 is therefore also triggered as soon as the AFR limit is reached to provide said intensity count (Tp). The intensity count (Tp) provides the measure of how much above the AFR limit the current AFR is as the counter 18 may be set to increment faster, the further away from the AFR limit the engine 11 remains.

The waiting time threshold (Tw) may therefore prevent economy mode 14 from being activated as a result of a transient spike in the actual AFR. If the engine 11 is operated for a significant amount of time with the actual AFR just under the AFR limit, then this is an indicator that there is a reasonable load for which economy mode 14 would not be suitable. The intensity threshold (Ti) may therefore prevent a switch to economy mode 14 whilst the engine 11 is being operated at such a load, albeit if the actual AFR is above the AFR limit.

INDUSTRIAL APPLICATION

The engine system 10 may be used in a variety of applications, including (but not limited to) off highway work and construction vehicles and machines, such as excavators, graders, loaders and the like. The method of the present disclosure may be particularly useful in applications where the engine 11 is subject to variable loads. For example, where a work machine is operated to carry out heavy duty work such digging, the engine 11 will be subject to a heavy load, for which economy mode 14 may not be appropriate. However, if the machine was carrying out a cleaning operation, the engine 11 would be subject to a light load, for which economy mode 14 would be appropriate.

The combination of predetermined conditions, the FAR limit, the waiting time threshold (Tw) and the intensity threshold (Ti) may be set to ensure that the required operation of the engine 11 is not compromised and to minimise an impact on the transient performance perceived by the operator when the operating mode of the engine 11 is switched between economy and performance mode 14, 15.

The invention claimed is:

1. A method for automatically shifting an operating mode of an internal combustion engine between an economy mode and a performance mode comprising the steps of:
   determining a current fuel-air ratio at which the engine is operating;
   comparing the current fuel-air ratio to a predetermined fuel-air ratio limit;
   determining a time duration for which the current fuel-air ratio is below the fuel-air ratio limit and comparing the time duration to a predetermined waiting time threshold value;
   providing a count based on a difference between the current fuel-air ratio and the fuel-air ratio limit when the engine is operating at a current fuel-air ratio which is below the fuel-air ratio limit and comparing the count with an intensity threshold value;
   shifting the operating mode of the engine from the performance mode to the economy mode when both the time duration and the count exceed the waiting time threshold value and the intensity threshold value respectively; and
   shifting the operating mode of the engine from the economy mode to the performance mode when the current fuel-air ratio reaches or exceeds the fuel-air ratio limit.

2. A method for automatically shifting an operating mode of an internal combustion engine between an economy, mode and a performance mode comprising the steps f:
   determining a current air-fuel ratio at which the engine is operating;
   comparing the current air-fuel ratio to a predetermined air-fuel ratio limit;
   determining a time duration for which the current air-fuel ratio is above the air-fuel ratio limit and comparing the time duration to a predetermined waiting time threshold value;
   providing a count based on a difference between the current air-fuel ratio and the air-fuel ratio limit when the engine is operating at a current air-fuel ratio which is above the air fuel ratio limit and comparing the count with an intensity threshold value;
   shifting the operating mode of the engine from the performance mode to the economy mode when both the time duration and the count exceed the waiting time threshold value and the intensity threshold value respectively; and shifting the operating mode of the engine from the economy mode to the performance mode when the current fuel-air ratio reaches or falls below the air-fuel ratio limit.

3. A method as claimed in claim 1 in which the time duration and the count are reset to zero when the operating mode of the engine is shifted from the economy mode to the performance mode.

4. A method as claimed in claim 1 in which the time duration and count are set to zero when the engine is started and the shift from the performance mode to the economy mode is prohibited until the engine has satisfied predetermined start-up condition checks.

5. A method as claimed in claim 1 wherein the step of providing the count comprises determining the difference repeatedly such that the count is cumulative.

6. A method as claimed in claim 5 wherein determining the difference repeatedly is performed at a consistent predetermined time interval.

7. A method as claimed in claim 1 further comprising performing start-up condition checks and, in the event that a start-up condition check fails, maintaining the operating mode of the engine in the performance mode.

8. An engine system comprising:
an internal combustion engine having at least two operating modes comprising an economy mode and a performance mode;
at least one sensor providing at least one output signal according to at least one operating parameter of the engine; and
a controller configured to receive said at least one output signal from the at least one sensor and to determine the current fuel-air ratio of the engine from said at least one output signal;
wherein a predetermined fuel-air ratio limit, a predetermined waiting time threshold and a predetermined intensity threshold are stored in the controller and the controller is programmed to shift the operating mode of the engine between the economy mode and the performance mode according to the method of claim 1.

9. An engine system according to claim 8 wherein the at least one sensor comprises a fuel-air ratio sensor configured to provide the fuel-air ratio of the engine.

10. An engine system comprising:
an internal combustion engine having at least two operating modes comprising an economy mode and a performance mode;
at least one sensor providing at least one output signal according to at least one operating parameter of the engine; and
a controller configured to receive said at least one output signal from the at least one sensor and to determine the current air-fuel ratio of the engine from said at least one output signal;
wherein a predetermined air-fuel ratio limit, a predetermined waiting time threshold and a predetermined intensity threshold are stored in the controller and the controller is programmed to shift the operating mode of the engine between the economy mode and the performance mode according to the method of claim 2.

11. An engine system according to claim 10 wherein the at least one sensor comprises an air-fuel ratio sensor configured to provide the air-fuel ratio of the engine.

12. An engine system according to claim 8 wherein the at least one sensor comprises an oxygen sensor, wherein the operating parameter of the engine comprises a measure of oxygen within the engine.

13. An engine system according to claim 8 further comprising an engine control unit.

14. An engine system according to claim 13 wherein the engine control unit comprises the controller.

* * * * *